US010359517B2

(12) United States Patent
Hartel

(10) Patent No.: US 10,359,517 B2
(45) Date of Patent: Jul. 23, 2019

(54) APPARATUS AND METHOD FOR USING LASER GUIDES TO IDENTIFY THE SOURCE OF SOUND WAVES

(71) Applicant: FLUKE CORPORATION, Everett, WA (US)

(72) Inventor: Joel Andrew Hartel, Mukilteo, WA (US)

(73) Assignee: Fluke Corporation, Everett, WA (US)

( * ) Notice: Subject to any disclaimer, the term of this patent is extended or adjusted under 35 U.S.C. 154(b) by 373 days.

(21) Appl. No.: 15/257,783

(22) Filed: Sep. 6, 2016

(65) Prior Publication Data

US 2018/0067211 A1 Mar. 8, 2018

(51) Int. Cl.

| | |
|---|---|
| *G01S 17/08* | (2006.01) |
| *G01S 7/481* | (2006.01) |
| *G01S 17/02* | (2006.01) |
| *H04R 1/02* | (2006.01) |
| *G01M 3/24* | (2006.01) |
| *G01S 17/88* | (2006.01) |

(52) U.S. Cl.
CPC ............ *G01S 17/08* (2013.01); *G01M 3/243* (2013.01); *G01S 7/4811* (2013.01); *G01S 7/4814* (2013.01); *G01S 7/4815* (2013.01); *G01S 17/023* (2013.01); *G01S 17/88* (2013.01); *H04R 1/028* (2013.01)

(58) Field of Classification Search
CPC .......... G01N 21/1702; G01N 29/2418; G01N 2021/1793; G01N 2291/014; G01N 2291/0255
See application file for complete search history.

(56) References Cited

U.S. PATENT DOCUMENTS 5,780,724 A * 7/1998 Olender ............... G01M 3/38
73/24.01
6,095,682 A 8/2000 Hollander et al.
(Continued)

FOREIGN PATENT DOCUMENTS

| EP | 1 460 407 A1 | 9/2004 |
| JP | 11-174110 A | 7/1999 |
| JP | 2012-78125 A | 4/2012 |

OTHER PUBLICATIONS

D J Brassington, Photo-acoustic detection and ranging—a new technique for the remote detection of gases, 1982 J. Phys. D: Appl. Phys. 15 219 (Year: 1982).*
(Continued)

*Primary Examiner* — Luke D Ratcliffe
(74) *Attorney, Agent, or Firm* — Seed IP Law Group LLP

(57) ABSTRACT

An apparatus includes a reflector, a microphone coupled to the reflector, laser emitters coupled to the reflector, and a laser range finder coupled to the reflector. The laser range finder is configured to output a signal indicative of a distance between the reflector and an object. The apparatus adjusts a position and/or a power level of the laser emitters based on the distance between the reflector and the object. Additionally or alternatively, the apparatus adjusts a position and/or a power level of the laser emitters based on a type of sound waves. Laser beams of light emitted by the laser emitters visually indicate a region in which a source of detected sound waves is located.

14 Claims, 8 Drawing Sheets

(56) References Cited

U.S. PATENT DOCUMENTS 7,644,606 B2 * 1/2010 Sheen ................ G01N 21/1702
73/24.02
2007/0238993 A1 10/2007 Clarke et al.

OTHER PUBLICATIONS

SDT Ultrasound Solutions, "Airborne Ultrasound Sensors," URL <http://www.sdthearmore.com/products/sensors-and-accessories/airborne-ultrasound-sensors>, visited May 12, 2016, 1 page.
Extended European Search Report for EP Application No. 17189666.5-1210, dated Jan. 26, 2018, 5 pages.

* cited by examiner

APPARATUS AND METHOD FOR USING LASER GUIDES TO IDENTIFY THE SOURCE OF SOUND WAVES

BACKGROUND

Technical Field

The present disclosure relates to identifying a source of sound waves. More particularly, the present disclosure relates to identifying a source of ultrasonic sound waves with a measurement apparatus that has a laser guidance system.

Description of the Related Art

Sound waves emitted by a device may be indicative of a problem with the device. For example, when a component of a device is improperly aligned or is leaking (e.g., in pressurized pipes, valves, and fittings), the device may emit ultrasonic sound waves, i.e., waves having frequencies in the range of 20 kHz and 5 GHz. A technician may attempt to identify the source of the problem using a device that measures ultrasonic sound waves and produces an audio indicator to inform the technician that ultrasonic sound waves have been detected. Such devices typically include a highly directional microphone that a technician can aim at a particular piece of equipment to determine whether components of the equipment are emitting ultrasonic sound waves.

Because components of equipment are often clustered together, it can be difficult to determine which component is emitting ultrasonic sound waves. A technician may aim a microphone at a cluster of components and slowly move the microphone in a sweeping motion, for example, from left to right and back again. If ultrasonic sound waves are detected while the microphone is pointed in a particular direction, the technician may take a few steps in that direction and then move the microphone again in a sweeping motion. This procedure is repeated until the component emitting the ultrasonic sound waves is identified, which may take a considerable amount of time. Accordingly, it is desirable to enable technicians to more quickly identify sources of sound waves.

BRIEF SUMMARY

An apparatus may be summarized as including: a reflector; a microphone coupled to the reflector; a plurality of laser emitters coupled to the reflector; and a laser range finder coupled to the reflector, wherein the laser range finder is configured to output a signal indicative of a distance between the reflector and an object.

The apparatus may further include: at least one processor coupled to the microphone, the laser emitters, and the laser range finder; and at least one storage device storing processor-executable instructions that, when executed by the at least one processor, cause the at least one processor to control a power level of a laser beam of light output from each of the plurality of laser emitters based on the signal output by the laser range finder. The instructions, when executed by the at least one processor, may cause the at least one processor to control the power level of the laser beam of light output from each of the laser emitters based on the signal output by the laser range finder and a signal indicating a type of sound waves. The apparatus may further include: a plurality of motors coupled to the plurality of laser emitters, wherein each of the motors is configured to cause a respective one of the laser emitters to move relative to the reflector; at least one processor coupled to the microphone, the plurality of laser emitters, the laser range finder, and the plurality of motors; and at least one storage device storing processor-executable instructions that, when executed by the at least one processor, cause the at least one processor to control operation of the motors based on the signal output by the laser range finder. The instructions, when executed by the at least one processor, may cause the at least one processor to control operation of the motors based on the signal output by the laser range finder and a signal indicating a type of sound wave. The instructions, when executed by the at least one processor, may cause the at least one processor to control a power level of a laser beam of light output from each of the laser emitters based on the signal output by the laser range finder. The instructions, when executed by the at least one processor, may cause the at least one processor to control a power level of a laser beam of light output from each of the laser emitters based on the signal output by the laser range finder and a signal indicating the type of sound wave. The instructions, when executed by the at least one processor, may cause the at least one processor to control the motors to move the laser emitters to respective positions at which laser beams of light emitted by the laser emitters intersect a boundary of a main lobe of a directivity pattern of the reflector at a distance from the reflector that is based on the signal output from the laser range finder. The instructions, when executed by the at least one processor, may cause the at least one processor to control the motors to move the laser emitters to respective positions at which laser beams of light emitted by the laser emitters indicate a boundary of a measurement region in which the apparatus is configured to detect sound waves at a distance from the reflector that is based on the signal output from the laser range finder. The laser range finder may include a laser emitter, and wherein the instructions, when executed by the at least one processor, may cause the at least one processor to control the laser emitter of the laser range finder and the laser emitters coupled to the reflector to simultaneously emit laser beams of light.

A method may be summarized as including: determining a distance between a reflector and an object; adjusting at least one of a power level and a position of each of a plurality of laser emitters coupled to the reflector based on the determined distance between the reflector and the object; causing the plurality of laser emitters to emit a plurality of laser beams of light; and detecting sound waves emitted by the object using a microphone coupled to the reflector.

Adjusting at least one of the power level and the position of each of the plurality of laser emitters may include adjusting the position of each of the laser emitters by controlling a plurality of motors coupled to the laser emitters based on the determined distance between the reflector and the object. Adjusting at least one of the power level and the position of each of the plurality of laser emitters coupled to the reflector may include adjusting the power level of each of the plurality of laser emitters coupled to the reflector based on the determined distance between the reflector and the object. Adjusting at least one of the power level and the position of each of the plurality of laser emitters coupled to the reflector may include adjusting at least one of the power level and the position of each of the plurality of laser emitters coupled to the reflector based on the determined distance between the reflector and the object and a type of sound waves. The method may further include: receiving an indication of the type of sound waves.

A method may be summarized as including: receiving an indication of a type of sound waves; adjusting a power level of each of a plurality of laser emitters that is coupled to a reflector based on the type of sound waves; causing the plurality of laser emitters to emit a plurality of laser beams of light; and detecting the type of sound waves emitted by an object using a microphone that is coupled to the reflector.

The method may further include: adjusting a position of each of the laser emitters by controlling a plurality of motors coupled to the laser emitters based on the type of sound waves. The method may further include: determining a distance between the reflector and the object; and adjusting a position of each of the laser emitters by controlling a plurality of motors coupled to the laser emitters based on the determined distance between the reflector and the object. The method may further include: determining a distance between the reflector and the object; and adjusting a position of each of the laser emitters by controlling a plurality of motors coupled to the laser emitters, based on the determined distance between the reflector and the object and the type of sound waves.

DETAILED DESCRIPTION

Figure 1:
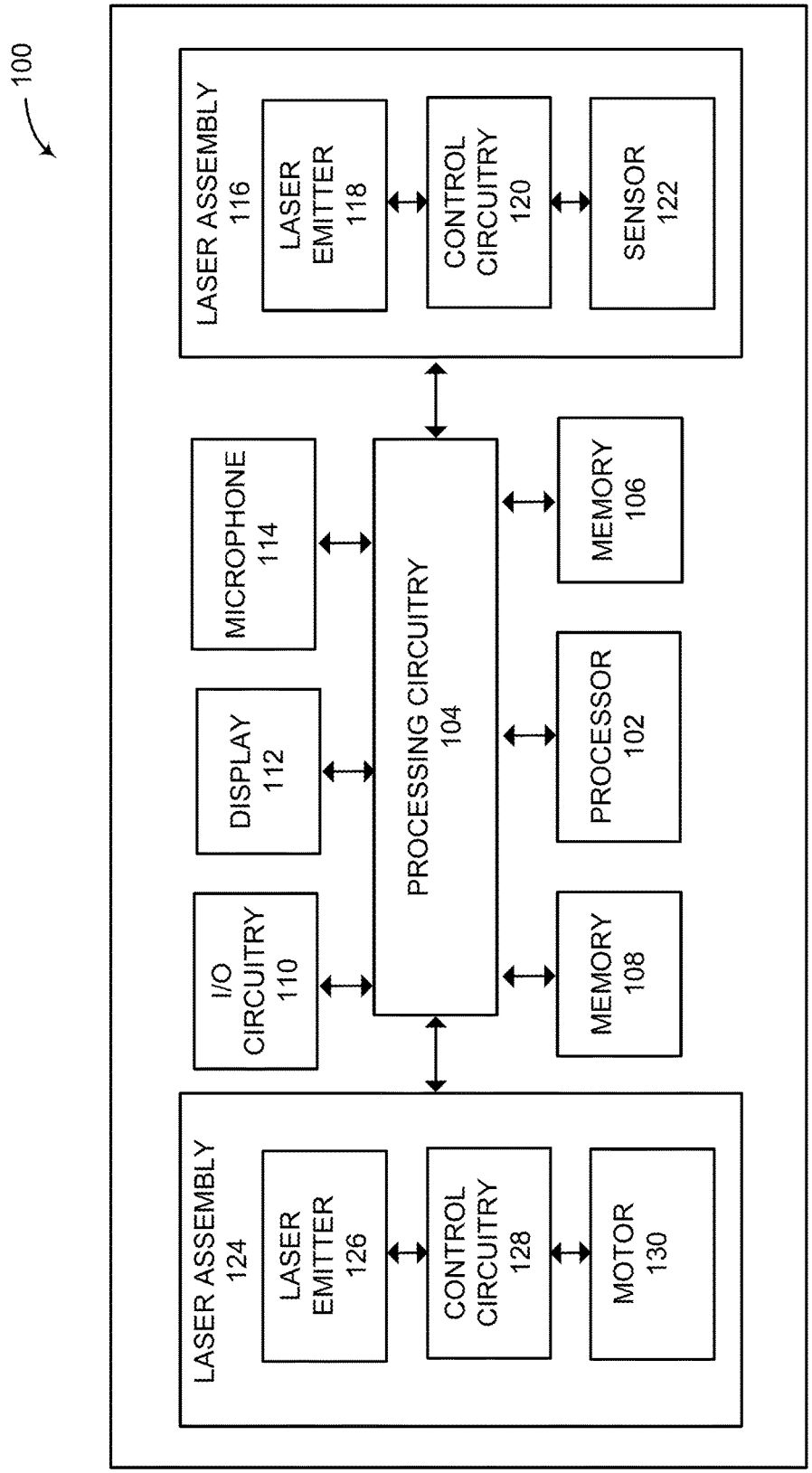
FIG. 1 is a block diagram of a measurement apparatus according to one or more embodiments of the present disclosure.

FIG. 1 is a block diagram of a measurement apparatus 100 according to one or more embodiments of the present disclosure. The measurement apparatus 100 includes a processor 102 that is communicatively coupled to processing circuitry 104. In one or more embodiments, the processing circuitry 104 includes one or more resistors, capacitors, inductors, buses, voltage level converters, analog-to-digital converters, digital signal processors (DSPs), coder/decoders (CODECs), etc. The processor 102 is electrically coupled to a first memory 106 and a second memory 108 via the processing circuitry 104. In one or more embodiments, the processor 102 is a central processing unit (CPU) or microprocessor unit (MPU). In one or more embodiments, the memory 106 is comprised of one or more Electronically Erasable Programmable Read Only Memory (EEPROM) modules. The memory 106 stores processor-executable instructions that, when executed by the processor 102, cause the measurement apparatus 100 to perform the functions described below. In one or more embodiments, the memory 108 is comprised of one or more Random Access Memory (RAM) modules. In one or more embodiments, the processor 102 uses the memory 108 as a working memory as the processor 102 executes the instructions that are stored by the memory 106.

The measurement apparatus 100 also includes input/output (I/O) circuitry 110. In one or more embodiments, the I/O circuitry 110 includes one or more input devices such as buttons, knobs, and dials that an operator can use to control operation of the measurement apparatus 100. Additionally, in one or more embodiments, the I/O circuitry 110 includes one or more output devices such as light emitting devices, speakers, audio interfaces, and data interfaces (e.g., Universal Serial Bus (USB) interfaces).

In one or more embodiments, the measurement apparatus 100 includes a display 112. The display 112 may be, for example, a light emitting diode (LED) display or a liquid crystal display (LCD). In other embodiments, the display 112 may include a touch sensor that enables an operator to input commands for controlling operation of the measurement apparatus 100.

The measurement apparatus 100 also includes a microphone 114. The microphone 114 includes a transducer (not shown) that converts sounds into corresponding electrical signals, which are provided to the processor 102 via the processing circuitry 104. In one or more embodiments, the microphone 114 is a highly directional microphone, such as a shotgun microphone, for example. In other embodiments, the microphone 114 is an omnidirectional microphone. In one or more embodiments, signals output from the microphone 114 are processed by an analog-to-digital converter, DSP, and/or CODEC included in the processing circuitry 104, and the processed signals are provided to the processor 102.

The measurement apparatus 100 further includes a laser assembly 116. The laser assembly 116 includes a laser emitter 118 and control circuitry 120 that causes the laser emitter 118 to emit a laser beam of light having a predetermined wavelength and a specified power level, in response to receiving control signals from the processor 102. The laser emitter 118 may include a laser diode. In one or more embodiments, the laser assembly 116 includes a sensor 122 configured to detect a portion of the laser beam of light emitted by the laser emitter 118 that is reflected by an object, and the control circuitry 120 is configured to output a signal indicative of a distance between the laser assembly 116 and the object based on the amount of time between the laser emitter 118 emitting the laser beam of light and the sensor 122 detecting the portion of the laser beam of light that has been reflected by the object. In one or more embodiments, the laser assembly 116 functions as a laser range finder that outputs a signal indicating the distance between the laser assembly 116 and the object. In one or more embodiments, the sensor 122 includes a photodiode that outputs a signal when illuminated with light. In one or more embodiments, the memory 106 stores instructions that, when executed by the processor 102, cause the processor to obtain the distance between a reflector 132 (shown in FIGS. 2-4B) and the object by adding together a first distance and a second distance, wherein the first distance is the distance between the laser assembly 116 and the object that is indicated by the output signal from the laser assembly 116, and the second distance is a predetermined distance between the reflector 132 and the laser assembly 116.

The measurement apparatus 100 also includes a plurality of laser assemblies 124 (only one of which is shown in FIG. 1). Each laser assembly 124 includes a laser emitter 126 and control circuitry 128 that causes the laser emitter 126 to emit a laser beam of light having a predetermined wavelength and a specified power level, in response to receiving control signals from the processor 102. In one or more embodiments, each laser assembly 124 includes a motor 130 that is mechanically coupled to the laser emitter 126 and is configured to move the laser emitter 126 in a specified direction by a specified amount, in response to receiving control signals from the control circuitry 128 and/or the processor 102. In one or more embodiments, the motor 130 is a stepper motor.

The laser emitter 126 may be mounted on a movable platform that can at least partially rotate about a pivot. A first gear is also mounted to the platform. The first gear is coupled to a second gear that is mounted on the rotor of the motor 130. Rotation of the rotor of the motor 130 causes the platform to move, which changes a position and/or orientation of the laser emitter 126. As will be explained in detail below, in one or more embodiments, the memory 106 stores instructions that cause the processor 102 to control each motor 130 so that a laser beam of light emitted by a corresponding laser emitter 126 provides an indication of part of a boundary of a measurement region from which the microphone 114 is configured to detect and measure sound waves.

Figure 2:
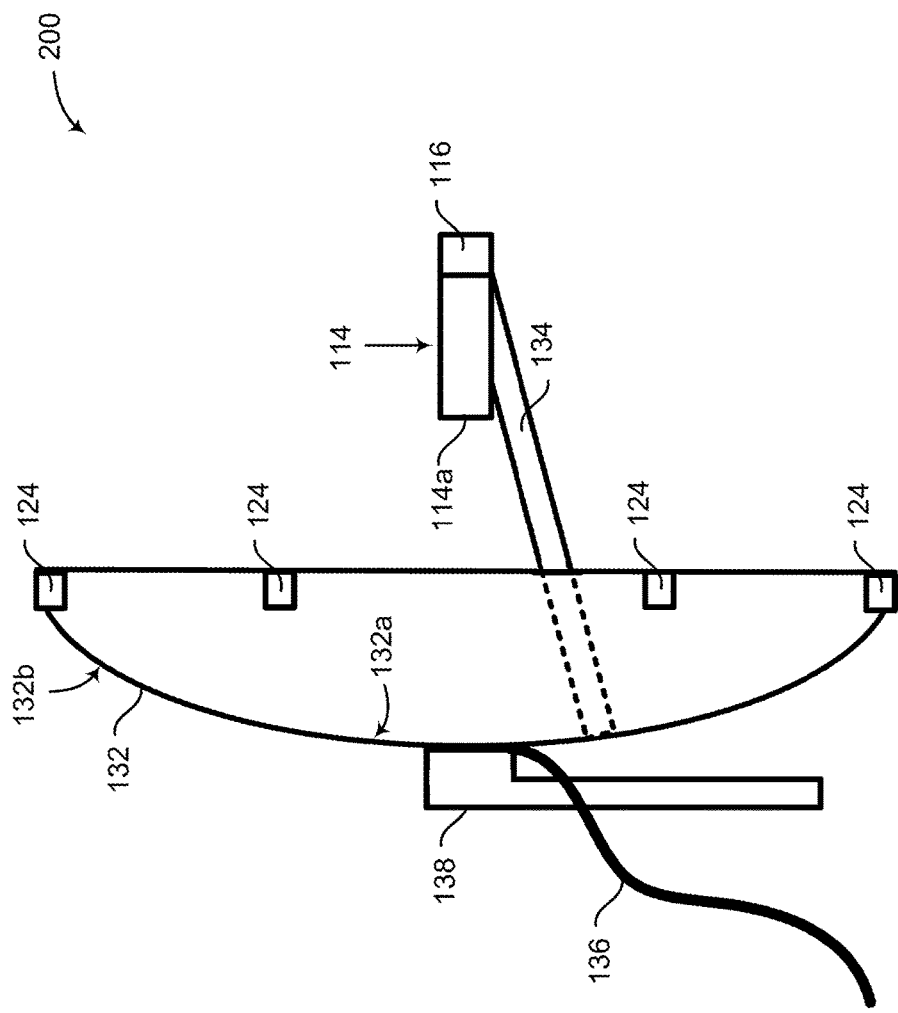
FIG. 2 is a side elevation view of a reflector assembly according to one or more embodiments of the present disclosure.

FIG. 2 is a side elevation view of a reflector assembly 200 according to one or more embodiments of the present disclosure. The reflector assembly 200 is part of the measurement apparatus 100 shown in FIG. 1. The reflector assembly 200 includes a reflector 132 and a support arm 134 that is mounted to the reflector 132 and the microphone 114, which keeps a sound receiving portion 114a of the microphone 114 positioned at a predetermined location with respect to the reflector 132. The reflector 132 reflects sound waves incident on an interior surface 132a thereof toward the sound receiving portion 114a of the microphone 114. Due to the size and shape of the reflector 132, the sound receiving portion 114a of the microphone 114 can receive a higher concentration of sound waves emitted from an object than if the sound receiving portion 114a of the microphone 114 were pointed directly toward the object. Accordingly, the reflector assembly 200 enables the measurement apparatus 100 to detect and measure sound waves emitted from an object that is a considerable distance from the measurement apparatus 100.

In one or more embodiments, the reflector 132 is a parabolic reflector having a circular lateral cross-sectional shape. In one or more embodiments, the laser assembly 116 is mounted to one end of the microphone 114. In other embodiments, the microphone 114 and the laser assembly 116 are provided in the same device.

In one or more embodiments, the measurement apparatus 100 includes a cable 136 that is configured to connect the processor 102 to the electronic devices provided on the reflector 132. More particularly, the cable 136 includes a plurality of wires (not shown) for providing control signals generated by the processor 102 and power from a power source (not shown) to the laser assembly 116 and the laser assemblies 124. In one or more embodiments, the control signals indicate when the laser emitters 118, 126 of the laser assemblies 116, 124 are to start and stop emitting laser beams of light. In one or more embodiments, the control signals indicate power levels at which respective laser emitters 118, 126 of the laser assemblies 116, 124 are to emit laser beams of light.

In addition, the cable 136 includes a plurality of wires for providing measurement signals generated by the microphone 114 and the laser assembly 116 to the processor 102. For example, one or more wires of the cable 136 are configured to carry a measurement signal generated by the microphone 114, wherein the measurement signal is indicative of sound waves that are incident on the sound receiving portion 114a of the microphone 114. Additionally, one or more of the wires of the cable 136 carry a measurement signal generated by the laser assembly 116, wherein the measurement signal is indicative of a distance between the laser assembly 116 and an object.

The reflector assembly 200 may include a handle 138 that is mounted to an exterior surface 132b of the reflector 132. An operator can hold the handle 138 while aiming the reflector assembly 200 at an object to determine whether the object is emitting a particular type of sound waves (e.g., ultrasonic sound waves having frequencies between 20 kHz and 200 kHz). In one or more embodiments, the I/O circuitry 110 shown in FIG. 1 includes a button that is mounted on the handle 138, wherein a first actuation of the button causes the measurement apparatus 100 to begin a measurement process and a second actuation of the button causes the measurement apparatus 100 to end the measurement process.

Figure 3:
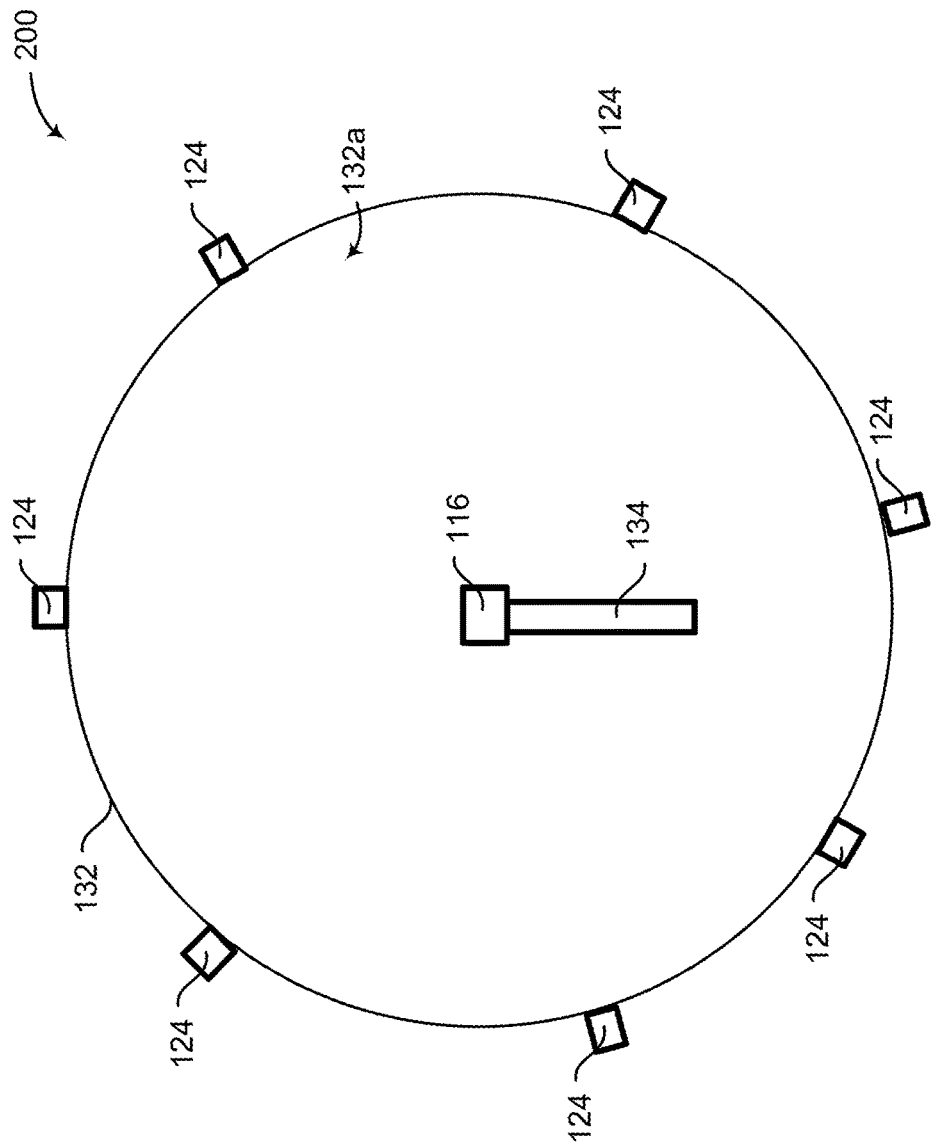
FIG. 3 is a front elevation view of the reflector assembly shown in FIG. 2.

FIG. 3 is a front elevation view of the reflector assembly 200. As shown in FIGS. 2 and 3, multiple laser assemblies 124 are mounted around the outer periphery of the reflector 132. In one or more embodiments, the laser assemblies 124 are mounted to the exterior surface 132b of the reflector 132. Although seven laser assemblies 124 are shown mounted to the reflector 132 in FIG. 3, any suitable number of laser assemblies 124 may be mounted to the reflector 132 to indicate a measurement region, without departing from the scope of the present disclosure.

Figure 4A:
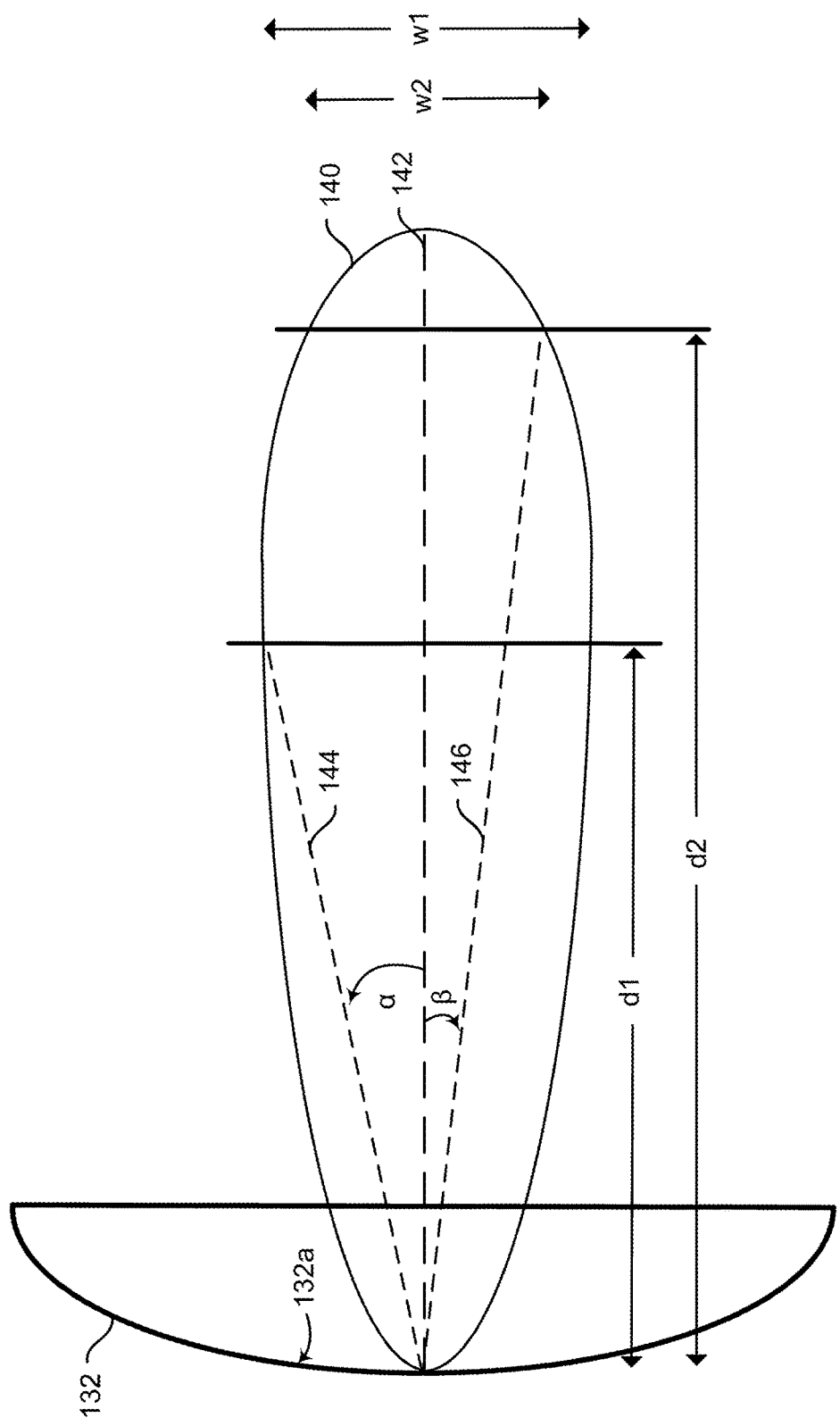
FIG. 4A is a side elevation view of a reflector showing a main lobe of a directivity pattern according to one or more embodiments of the present disclosure.

FIG. 4A is a side elevation view of the reflector 132 showing a main lobe 140 of a directivity pattern according to one or more embodiments of the present disclosure. As will be appreciated by those skilled in the relevant art(s), the size and shape of the main lobe 140 of the directivity pattern of the reflector 132 depend on the size and shape of the reflector 132 in addition to the wavelength of sound waves incident on the interior surface 132a of the reflector 132. When sound waves of a first wavelength are incident on the reflector 132, the main lobe 140 has the size and shape shown in FIG. 4A. A reference line 142 corresponds to a central axis of the reflector 132. In one or more embodiments, the reference line 142 corresponds to the axis of symmetry of the reflector 132 and/or the main lobe 140 of the directivity pattern of the reflector 132. In one or more embodiments, the main lobe 140 of the directivity pattern of the reflector 132 corresponds to a measurement region of the measurement apparatus 100.

As shown in FIG. 4A, the width of the main lobe 140 varies as a function of distance from the reflector 132. For example, at a distance d1 from the reflector 132, the main lobe 140 has a width w1. At a distance d2 from the reflector 132, the main lobe 140 has a width w2, which is less than the width w1. A reference line 144 that extends from the center of the reflector 132 and intersects a boundary of the main lobe 140 at the distance d1 from the reflector 132 forms an angle $\alpha$ with the reference line 142. A reference line 146 that extends from the center of the reflector 132 and intersects a boundary of the main lobe 140 at the distance d2 from the reflector 132 forms an angle β with the reference line 142.

In one or more embodiments, the width of a measurement region at a particular distance from the reflector 132 is equal to the width of the main lobe 140 at that distance. For example, the width w1 of the main lobe 140 at the distance d1 from the reflector 132 is equal to $2 \times d1 \times \tan(\alpha)$. The size of a cross-sectional area of a measurement region at the distance d1 from the reflector 132 is proportional to the width of the main lobe 140 at the distance d1 from the reflector 132. For example, in one or more embodiments in which the main lobe 140 has a circular cross section, the circumferential size of the cross-sectional area of the measurement region at the distance d1 from the reflector 132 is equal to $\pi \times w1$. In the example shown in FIG. 4A, the angle α is greater than the angle β, and the size of the measurement area at the distance d1 from the reflector 132 is larger than the size of the measurement area at the distance d2 from the reflector 132.

Figure 4B:
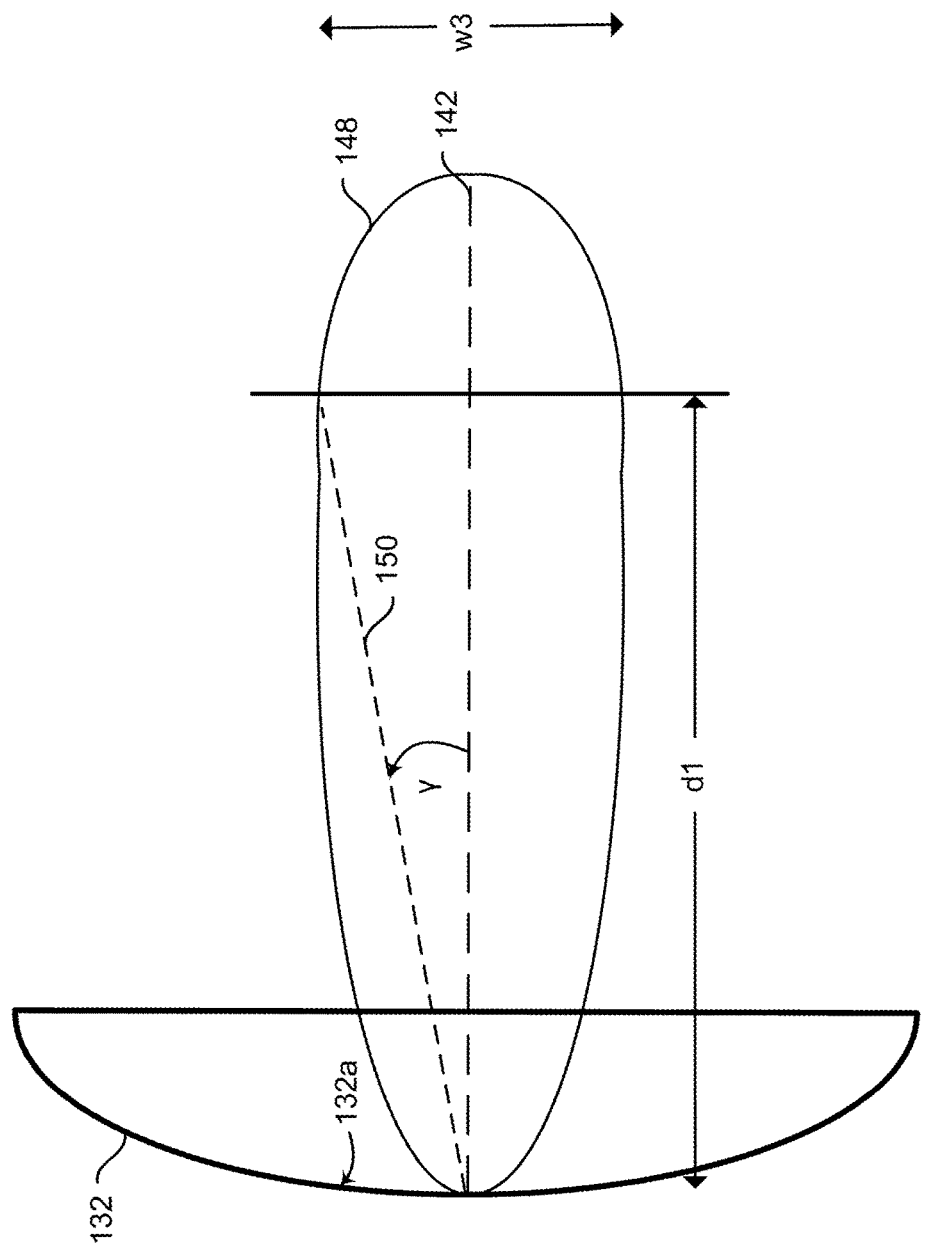
FIG. 4B is a side elevation view of a reflector showing a main lobe of a directivity pattern according to one or more embodiments of the present disclosure.

FIG. 4B is a side elevation view of the reflector 132 showing a main lobe 148 of a directivity pattern according to one or more embodiments of the present disclosure. The size of the main lobe 148 shown in FIG. 4B is different from the size of the main lobe 140 shown in FIG. 4A. The main lobe 140 shown in FIG. 4A corresponds to sound waves of a first wavelength reflecting off the interior surface 132a of the reflector 132, and the main lobe 148 shown in FIG. 4B corresponds to sound waves of a second wavelength reflecting off the interior surface 132a of the reflector 132. The main lobe 148 has a width w3 at the distance d1 from the reflector 132. A reference line 150 that extends from the center of the reflector 132 and intersects a boundary of the main lobe 148 at the distance d1 from the reflector 132 forms an angle γ with the reference line 142.

In the examples shown in FIGS. 4A and 4B, the widths w1 and w2 of the main lobe 140 and the width w3 of the main lobe 148 are different. In addition, the angles α, β, and γ are different. As shown in FIGS. 4A and 4B, the width of the main lobe 140, 148 of the directivity pattern of the reflector 132 varies not only as a function of the distance from the reflector 132, but also as function of the wavelength of sound waves that are incident on the reflector 132. When a particular type of sound waves (e.g., sound waves of a particular wavelength or frequency) are incident on the interior surface 132a of the reflector 132, the width of the main lobe of the directivity pattern of the reflector 132 at a specified distance from the reflector 132 can be determined.

For example, in one or more embodiments, the memory 106 stores a table or other suitable data structure in which the width of the main lobe of the directivity pattern of the reflector 132 at each of a plurality of distances from the reflector 132 is stored in association with the respective distances from the reflector 132. Additionally or alternatively, the memory 106 stores a table or other suitable data structure in which the angle formed between the reference line 142 and a reference line that passes through a boundary of the main lobe of the directivity pattern of the reflector 132 at each of a plurality of distances from the reflector 132 is stored in association with the respective distance from the reflector 132. In one or more embodiments, the memory 106 stores a plurality of such tables or data structures, wherein each table or data structure is associated with a particular type of sound wave. For example, the memory 106 stores a first table for a first wavelength in which the width w1 is associated with the distance d1 from the reflector 132, and a second table for a second wavelength in which the width w3 is associated with the distance d1 from the reflector 132.

The memory 106 also stores instructions that, when executed by the processor 102, cause the processor 102 to obtain the width of the main lobe of the directivity pattern of the reflector 132 at a specified distance from the reflector 132. In one or more embodiments, the instructions cause the processor 102 to determine a distance to an object being measured (e.g., based on a measurement signal provided by the laser assembly 116), determine a type of sound waves emitting from the object (e.g., based on a signal corresponding to user input received via the I/O circuitry 110 or signal input based on measurements from the object), and determine the width of the main lobe of the directivity pattern of the reflector 132 at the determined distance for the determined type of sound waves using information stored by the memory 106. For example, the instructions may cause the processor 102 to determine that the distance from the reflector 132 to an object is d1, determine that the type of sound waves is sound waves having a first wavelength, and determine that the width of the main lobe of the directivity pattern of the reflector 132 is w1. In one or more embodiments, the memory 106 stores instructions that cause the processor 102 to retrieve a width of the directivity pattern of the reflector 132 from a table associated with sound waves having the first wavelength using the determined distance from the reflector 132 to the object. In one or more embodiments, the instructions also cause the processor 102 to generate control signals that are provided to the laser assemblies 124 to cause the motors 130 (see FIG. 1) to reposition and aim the laser emitters 126 such that laser beams of light emitted therefrom intersect the main lobe of the directivity pattern of the reflector 132 or otherwise indicate a measurement region having the determined width, at the determined distance. In one or more embodiments, the instructions cause the processor 102 to interpolate the width of the main lobe of the directivity pattern of the reflector 132 when the determined distance from the reflector 132 is numerically between two distances stored in a table or data structure, according to mathematical interpolation techniques.

Figures 5A, 5B:
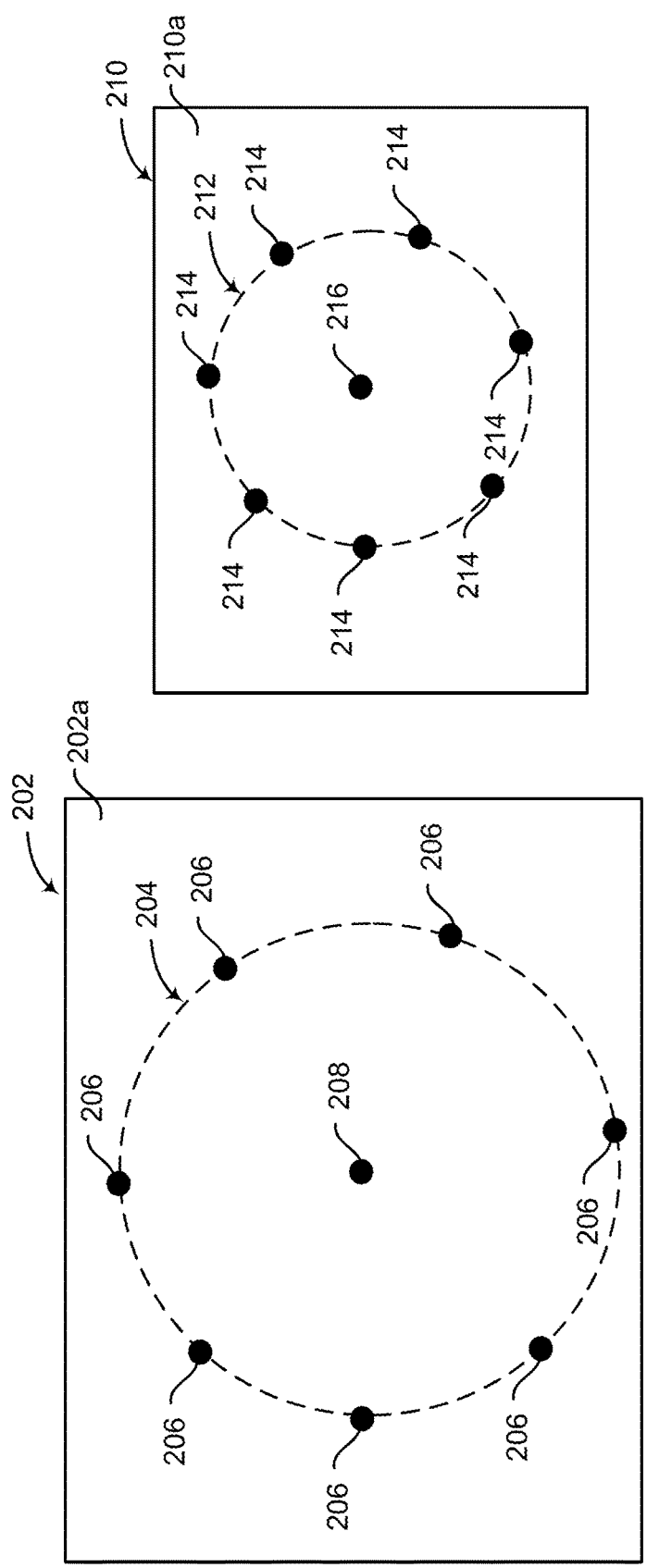
FIG. 5A is a front elevation view of a surface of an object on which a measurement region is indicated according to one or more embodiments of the present disclosure.
FIG. 5B is a front elevation view of a surface of an object on which a measurement region is indicated according to one or more embodiments of the present disclosure.

FIG. 5A is a front elevation view of a surface 202a of an object 202 on which the size of a measurement region 204 is indicated according to one or more embodiments of the present disclosure. A plurality of bright spots of colored light 206 indicates the outer periphery of the measurement region 204. The bright spots of colored light 206 result from the laser beams of light emitted by the laser emitters 126 of the laser assemblies 124, which are mounted around the outer periphery of the reflector 132. In one or more embodiments, a bright spot of colored light 208 indicates the center of the measurement region. The bright spot of colored light 208 results from the laser beam of light emitted by the laser emitter 118 of the laser assembly 116, which is mounted at the center of the reflector 132. The bright spots of colored light 206, 208 are visible when an operator aims the reflector assembly 200 at the object 202 and instructs the measurement apparatus 100 to measure sound waves, for example, by pressing a button provided on the handle 138. The bright spots of colored light 206, 208 are visual indicators that an operator may use to identify the source of detected sound waves. In one or more embodiments, the memory 106 stores instructions that cause the processor 102 to control the laser emitter 118 of the laser assembly 116 and the laser emitters 126 of the laser assemblies 124 to simultaneously emit laser beams of light therefrom.

For example, if the operator is attempting to identify which device in a cluster of devices is emitting sound waves, the operator can aim the reflector assembly 200 toward the cluster of devices and move the reflector in a sweeping motion. When the measurement apparatus 100 indicates that a particular type of sound waves has been detected, for example, by providing an audio tone to a pair of headphones worn by the operator, the operator can stop moving the reflector assembly 200 and observe the bright spots of colored light 206, 208. If only one device is within the pattern formed by the bright spots of colored light 206, the operator can deduce that the device is emitting the sound waves that are detected by the measurement apparatus 100. If more than one device is within the pattern formed by the bright spots of colored light 206, the operator can obtain additional measurements, possibly at different distances, using the measurement apparatus 100 to determine which of the devices is the source of the detected sound waves. FIG. 5B is a front elevation view of a surface 210*a* of an object 210 on which the size of a measurement region 212 is indicated according to one or more embodiments of the present disclosure. A plurality of bright spots of colored light 214 indicates the outer periphery of the measurement region 212. The bright spots of colored light 206 result from the laser beams of light emitted by laser emitters 126 of the laser assemblies 124, which are mounted around the outer periphery of the reflector 132. A bright spot of colored light 216 indicates the center of the measurement region. The bright spot of colored light 216 results from the light emitted by the laser emitter 118 of the laser assembly 116, which is mounted at the center of the reflector 132. The bright spots of colored light 214, 216 are visible when an operator aims the reflector assembly 200 at the object 210 and instructs the measurement apparatus 100 to measure sound waves, for example, by depressing a button provided on the handle 138. The bright spots of colored light 214, 216 provide the operator with visual indicators that are useful for identifying a particular source of sound waves.

The measurement region 204 shown in FIG. 5A may result when the measurement apparatus 100 is configured to measure sound waves having a first wavelength and the object 202 is located at the distance d1 from the reflector 132, as shown in FIG. 4A. The diameter or width of the measurement region 204 shown in FIG. 5A is w1. The measurement region 212 shown in FIG. 5B may result when the measurement apparatus 100 is configured to measure sound waves having a second wavelength and the object 210 is located at the distance d1 from the reflector 132, as shown in FIG. 4B. The diameter or width of the measurement region 212 shown in FIG. 5B is w3, which is less than w1. Because the size of the main lobe 140 at the distance d1 from the reflector 132 is larger than the size of the main lobe 148 at the distance d1 from the reflector 132, the size of the measurement region 204 shown in FIG. 5A is larger than the size of the measurement region 212 shown in FIG. 5B.

As previously mentioned, the main lobe 140 shown in FIG. 4A corresponds to sound waves having a first wavelength, and the main lobe 148 shown in FIG. 4B corresponds to sound waves having a second wavelength. Accordingly, if an operator is attempting to identify a device that is emitting sound waves having the second wavelength, the operator can configure the measurement apparatus 100 for sound waves having the second wavelength, for example, by pressing a button included in the I/O circuitry 110. In response, the processor 102 causes the motors 130 to aim the laser emitters 126, for example, by causing the motors to orient the laser emitters 126 toward the reference line 142 to a greater extent than if the measurement apparatus 100 were configured to detect sound waves having the first wavelength. In other words, the processor 102 can cause the motors 130 to aim the laser emitters 126 so that a smaller measurement region is indicated on the object surface 210*a* at a given distance compared to the size of a measurement region that would be indicated on the object surface 210*a* at that distance if the measurement apparatus 100 were configured to detect another type of sound waves. Accordingly, configuring the measurement apparatus 100 to detect a particular type of sound waves can result in the operator searching a relatively small region and quickly identifying the source of the detected sound waves.

Figure 6:
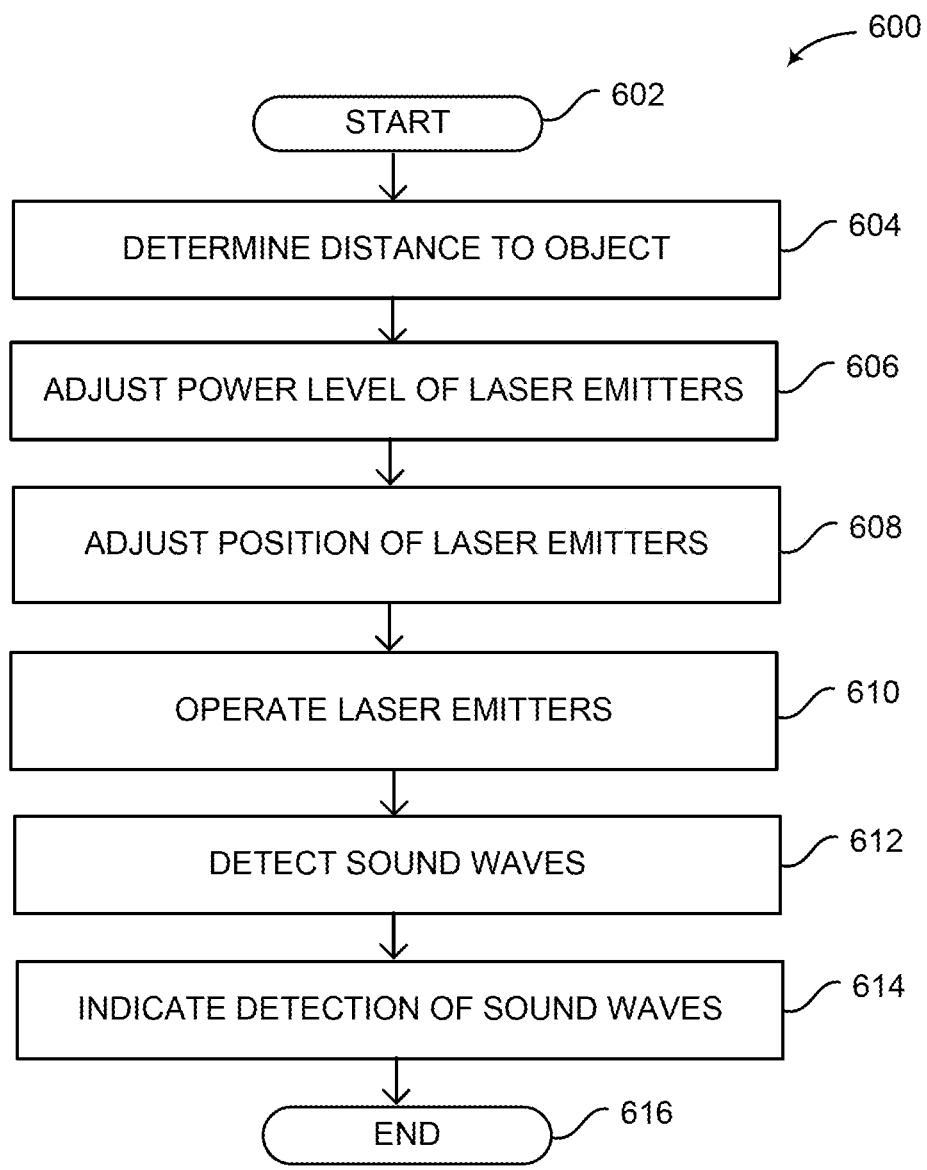
FIG. 6 is a flowchart of a method according to one or more embodiments of the present disclosure.

FIG. 6 is a flowchart of a method 600 according to one or more embodiments of the present disclosure. In one or more embodiments, the method 600 is performed by the measurement apparatus 100. The method 600 begins at 602. For example, the method 600 begins when an operator presses a predetermined button included in the I/O circuitry 110.

At 604, a distance to an object is determined. In one or more embodiments, the memory 106 stores instructions that cause the processor 102 to generate a control signal that is provided to the laser assembly 116, in response to a predetermined button included in the I/O circuitry 110 being pressed, which causes the laser emitter 118 to emit a laser beam of light at an object for a predetermined amount of time. The control signal also causes the control circuitry 120 to generate a measurement signal indicating a distance from the laser assembly 116 to the object. In one or more embodiments, the control circuitry 120 generates the measurement signal indicating the distance to the object using techniques employed in laser range finders.

At 606, the power level of laser emitters 126 is adjusted based on the distance to the object that is determined at 604. In one or more embodiments, the memory 106 stores instructions that cause the processor 102 to determine a power level for the laser emitters 126 of the laser assemblies 124, wherein the determined power level causes laser beams of light emitted by the laser emitters 126 to travel the distance to the object that is determined at 604. The instructions also cause the processor 102 to generate a control signal that is provided to the laser assemblies 124, which causes the control circuitry 128 to adjust the power supplied to the laser emitters 126 based on the control signal. In one or more embodiments, the above-described acts at 606 are optional.

At 608, the position of the laser emitters 126 is adjusted. In one or more embodiments, the memory 106 stores instructions that cause the processor 102 to determine a position or orientation for each of the laser emitters 126 of the laser assemblies 124, wherein the determined position or orientation causes laser beams of light emitted by the laser emitters 126 to intersect the boundary of the main lobe of the directivity pattern of the reflector 132 at the distance from the reflector 132 determined at 604. The memory 106 also stores instructions that cause the processor 102 to generate control signals that are provided to the laser assemblies 124, which cause the control circuitry 128 to control the motors 130 so that the laser emitters 126 are pointed in respective directions or orientations that result in the laser beams of light emitted therefrom intersecting the boundary of the main lobe of the directivity pattern of the reflector 132 at the distance from the reflector 132 that is determined at 604. In one or more embodiments, the above-described acts at 608 are optional.

At 610, the laser emitters 126 are operated to emit laser beams of light. In one or more embodiments, the memory 106 stores instructions that cause the processor 102 to generate control signals that are provided to the laser assemblies 124, which cause each of the laser emitters 126 to emit a respective laser beam of light. For example, at 610, an operator aims the reflector assembly 200 at the object while the processor 102 is generating the control signals that cause the laser emitters 126 to emit laser beams of light.

At 612, sound waves are detected by the measurement apparatus 100. In one or more embodiments, sound waves emitted by the object are reflected off the interior surface 132a of the reflector 132 toward the sound receiving portion 114a of microphone 114 and the microphone 114 outputs a corresponding measurement signal. The measurement signal output from the microphone 114 is provided to the processor 102 via the processing circuitry 104. The memory 106 stores instructions that cause the processor 102 to determine that sound waves of a specified type have been detected based on the measurement signal provided by the microphone 114.

At 614, the detection of sound waves is indicated to an operator. In one or more embodiments, the memory 106 stores instructions that cause the processor 102 to cause an audio signal to be provided to an audio jack interface included in the I/O circuitry 110 upon detection of sound waves of a specified type. When an operator is wearing headphones that are plugged into the audio jack interface, the operator hears the audio signal, which indicates to the operator that the sound waves of the specified type have been detected. In one or more embodiments, the memory 106 stores instructions that cause the processor 102 to cause power to be provided to an LED included in the I/O circuitry 110. When an operator sees the LED illuminated, detection of sound waves of the specified type is indicated to the operator.

At 616, the method 600 ends. In one or more embodiments, the memory 106 stores instructions that cause the processor 102 to generate control signals that are provided to the laser assemblies 124 to cause the control circuitry 128 to control the laser emitters 126 to stop emitting laser beams of light. In one or more embodiments, the memory 106 stores instructions that cause the processor 102 to generate control signals that are provided to the laser assemblies 124 which cause the control circuitry 128 to control the motors 130 to return the laser emitters 126 to a default position or orientation.

Figure 7:
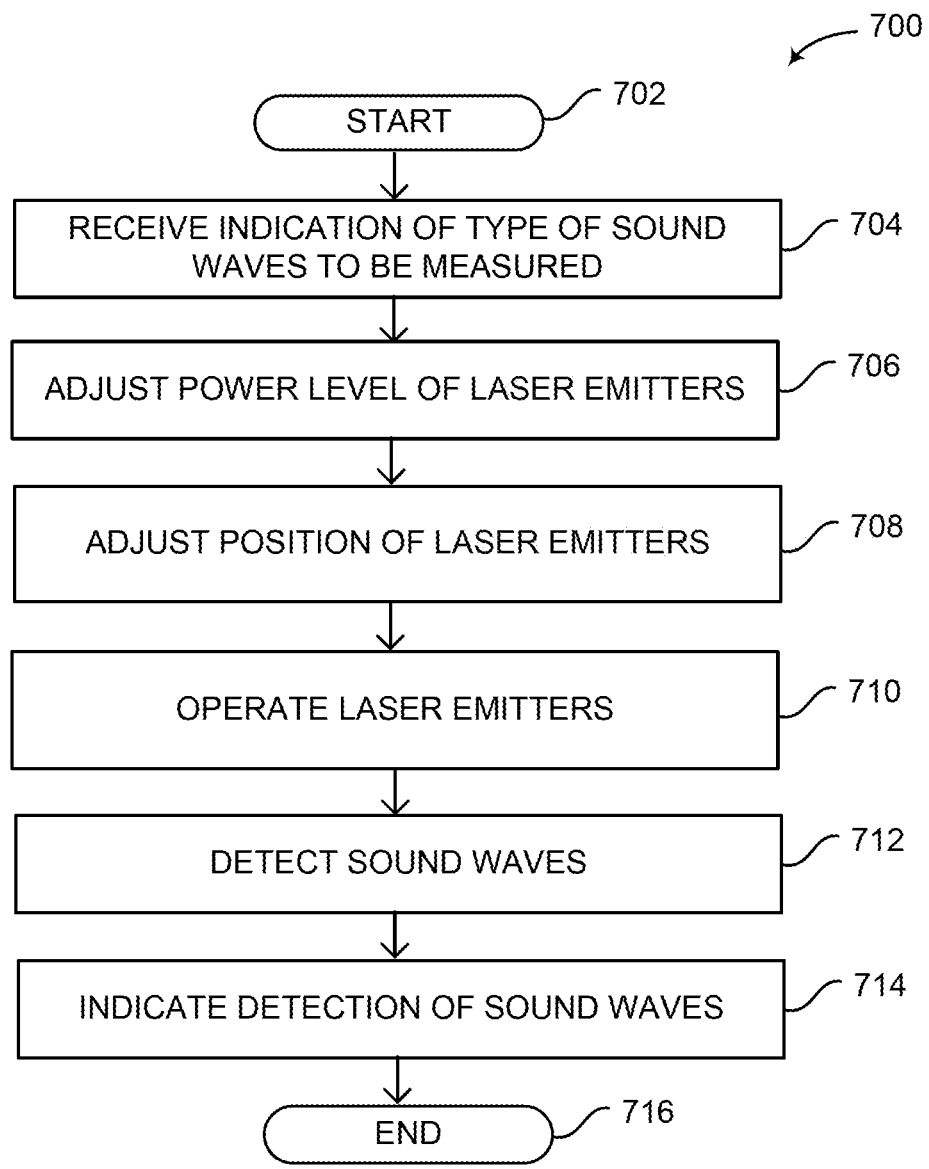
FIG. 7 is a flowchart of a method according to one or more embodiments of the present disclosure.

FIG. 7 is a flowchart of a method 700 according to one or more embodiments of the present disclosure. In one or more embodiments, the method 700 is performed by the measurement apparatus 100. The method 700 begins at 702. For example, the method 700 begins when an operator presses a predetermined button included in the I/O circuitry 110.

At 704, an indication of a type of sound waves to be measured is received. In one or more embodiments, the processor 102 receives a control signal indicating an operator selection made via a button of the I/O circuitry 110, wherein the control signal indicates the type of sound waves to be measured. For example, a first control signal indicates a first type of sound waves having a frequency in a range of 20 kHz to 200 kHz, and a second control signal indicates a second type of sound waves having a frequency in a range of 500 kHz to 5 GHz. Alternatively or additionally, an indication of the type of sound waves may be obtained from one or more preliminary measurements made by the measurement apparatus 100 and fed to the processor 102

At 706, the power level of the laser emitters 126 is adjusted based on the indication of the type of sound waves that is received at 604. In one or more embodiments, the memory 106 stores instructions that cause the processor 102 to determine a power level for the laser emitters 126 of the laser assemblies 124, wherein the determined power level causes laser beams of light emitted by the laser emitters 126 to travel to the end of the main lobe of the directivity pattern of the reflector 132. The memory 106 also stores instructions that cause the processor 102 to generate a control signal that is provided to the laser assemblies 124, which causes the control circuitry 128 therein to adjust the power supplied to a corresponding laser emitter 126 based on the control signal. Accordingly, if an operator points the reflector assembly 200 at an object and the laser beams of light emitted by the laser emitters 126 do not illuminate the object, the operator can ascertain that the measurement apparatus 100 is not able to detect sound waves emitted from that object because it is too far away from the measurement apparatus 100. In one or more embodiments, the above-described acts at 706 are optional.

At 708, the position of the laser assemblies is adjusted. In one or more embodiments, the memory 106 stores instructions that cause the processor 102 to determine a position or orientation for the laser emitters 126 of the laser assemblies 124, wherein the determined position or orientation causes laser beams of light emitted by the laser emitters 126 to intersect the boundary of the directivity pattern of the reflector 132 at a specified distance from the reflector 132. The memory 106 also stores instructions that cause the processor 102 to generate control signals that are provided to the laser assemblies 124, which causes the control circuitry 128 to control the motors 130 so that the laser emitters 126 are pointed in respective directions or orientations that result in the laser beams of light emitted therefrom intersecting the boundary of the main lobe of the directivity pattern of the reflector 132 at the specified distance from the reflector 132. In one or more embodiments, the above-described acts at 708 are optional.

At 710, the laser emitters 126 are operated to emit laser beams of light. In one or more embodiments, the memory 106 stores instructions that cause the processor 102 to generate control signals that are provided to the laser assemblies 124, wherein the control signals cause each of the laser emitters 126 to emit a laser beam of light. For example, at 710, an operator aims the reflector assembly 200 at the object while the processor 102 is generating control signals that cause the laser emitters 126 to emit laser beams of light.

At 712, sound waves are detected by the measurement apparatus 100. In one or more embodiments, sound waves emitted by an object are reflected off the interior surface 132a of the reflector 132 toward the sound receiving portion 114a of the microphone 114, and the microphone 114 outputs a corresponding measurement signal. The measurement signal output from the microphone 114 is provided to the processor 102 via the processing circuitry 104. In one or more embodiments, the memory 106 stores instructions that cause the processor 102 to determine that sound waves of the specified type have been detected based on the measurement signal provided by the microphone 114.

At 714, the detection of sound waves is indicated to an operator. In one or more embodiments, the memory 106 stores instructions that cause the processor 102 to cause an audio signal to be provided to an audio jack interface included in the I/O circuitry 110 upon detection of sound waves. When an operator is wearing headphones that are plugged into the audio jack interface, the operator can hear the audio signal, which indicates that the sound waves have been detected to the operator. By way of another example, the memory 106 stores instructions that cause the processor 102 to generate a control signal that causes power to be provided to one or more LEDs included in the I/O circuitry 110 upon detection of sound waves. When an operator sees the LEDs illuminated, detection of sound waves of the specified type is indicated to the operator. Illumination of a series of LEDs may indicate a relative strength or amplitude of the detected sound waves.

At 716, the method 700 ends. In one or more embodiments, the memory 106 stores instructions that cause the processor 102 to generate control signals that are provided to the laser assemblies 124, which cause the control circuitry 128 to control the laser emitters 126 to stop emitting laser beams of light. In one or more embodiments, the memory 106 stores instructions that cause the processor 102 to generate control signals that are provided to the laser assemblies 124, which cause the control circuitry 128 to control the motors 130 to return the laser emitters 126 to a default position or orientation.

The various embodiments described above can be combined to provide further embodiments. For example, in the process 600 described above, the power level of the laser emitters 126 and/or the position or orientation of the laser emitters 126 is adjusted based on a detected distance to an object. In the process 700 described above, the power level of the laser emitters 126 and/or the position or orientation of the laser emitters 126 is adjusted based on a specified type of sound waves that the measurement apparatus 100 is configured to detect. In one or more embodiments, the processor 102 adjusts the power level of the laser emitters 126 and/or the position or orientation of the laser emitters 126 based on both a detected distance to an object and a specified type of sound waves that the measurement apparatus 100 is configured to detect.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the foregoing disclosure.

The invention claimed is:

1. An apparatus, comprising:
a reflector;
a microphone coupled to the reflector;
a plurality of laser emitters coupled to the reflector;
a laser range finder coupled to the reflector, wherein the laser range finder is configured to output a signal indicative of a distance between the reflector and an object;
at least one processor coupled to the microphone, the laser emitters, and the laser range finder; and
at least one storage device storing processor-executable instructions that, when executed by the at least one processor, cause the at least one processor to control a power level of a laser beam of light output from each of the plurality of laser emitters based on the signal output by the laser range finder,
wherein the instructions, when executed by the at least one processor, cause the at least one processor to control the power level of the laser beam of light output from each of the laser emitters based on the signal output by the laser range finder and a signal indicating a type of sound waves.

2. The apparatus according to claim 1, further comprising:
a plurality of motors coupled to the plurality of laser emitters, wherein each of the motors is configured to cause a respective one of the laser emitters to move relative to the reflector,
wherein the instructions, when executed by the at least one processor, cause the at least one processor to control operation of the motors based on the signal output by the laser range finder.

3. The apparatus according to claim 2 wherein the instructions, when executed by the at least one processor, cause the at least one processor to control operation of the motors based on the signal output by the laser range finder and a signal indicating a type of sound wave.

4. The apparatus according to claim 2 wherein the instructions, when executed by the at least one processor, cause the at least one processor to control a power level of a laser beam of light output from each of the laser emitters based on the signal output by the laser range finder.

5. The apparatus according to claim 2 wherein the instructions, when executed by the at least one processor, cause the at least one processor to control a power level of a laser beam of light output from each of the laser emitters based on the signal output by the laser range finder and a signal indicating the type of sound wave.

6. The apparatus according to claim 2 wherein the instructions, when executed by the at least one processor, cause the at least one processor to control the motors to move the laser emitters to respective positions at which laser beams of light emitted by the laser emitters intersect a boundary of a main lobe of a directivity pattern of the reflector at a distance from the reflector that is based on the signal output from the laser range finder.

7. The apparatus according to claim 2 wherein the instructions, when executed by the at least one processor, cause the at least one processor to control the motors to move the laser emitters to respective positions at which laser beams of light emitted by the laser emitters indicate a boundary of a measurement region in which the apparatus is configured to detect sound waves at a distance from the reflector that is based on the signal output from the laser range finder.

8. The apparatus according to claim 1 wherein the laser range finder includes a laser emitter, and wherein the instructions, when executed by the at least one processor, cause the at least one processor to control the laser emitter of the laser range finder and the laser emitters coupled to the reflector to simultaneously emit laser beams of light.

9. A method, comprising:
determining a distance between a reflector and an object;
adjusting at least one of a power level and a position of each of a plurality of laser emitters coupled to the reflector based on the determined distance between the reflector and the object, wherein adjusting at least one of the power level and the position of each of the plurality of laser emitters includes adjusting the position of each of the laser emitters by controlling a plurality of motors coupled to the laser emitters based on the determined distance between the reflector and the object;
causing the plurality of laser emitters to emit a plurality of laser beams of light; and
detecting sound waves emitted by the object using a microphone coupled to the reflector.

10. The method according to claim 9 wherein adjusting at least one of the power level and the position of each of the plurality of laser emitters coupled to the reflector includes adjusting the power level of each of the plurality of laser emitters coupled to the reflector based on the determined distance between the reflector and the object.

11. The method according to claim 9 wherein adjusting at least one of the power level and the position of each of the plurality of laser emitters coupled to the reflector includes adjusting at least one of the power level and the position of each of the plurality of laser emitters coupled to the reflector based on the determined distance between the reflector and the object and a type of sound waves.

12. The method according to claim 11, further comprising:
receiving an indication of the type of sound waves.

13. A method, comprising:
receiving an indication of a type of sound waves;
adjusting a position of each of the laser emitters by controlling a plurality of motors coupled to the laser emitters based on the type of sound waves;
adjusting a power level of each of a plurality of laser emitters that is coupled to a reflector based on the type of sound waves;
causing the plurality of laser emitters to emit a plurality of laser beams of light; and
detecting the type of sound waves emitted by an object using a microphone that is coupled to the reflector.

14. The method according to claim 13, further comprising:
determining a distance between the reflector and the object,
wherein adjusting the position of each of the laser emitters by controlling the plurality of motors coupled to the laser emitters is based on the determined distance between the reflector and the object and the type of sound waves.

* * * * *